United States Patent
Ben Himane et al.

(10) Patent No.: US 10,192,145 B2
(45) Date of Patent: Jan. 29, 2019

(54) METHOD OF PROVIDING IMAGE FEATURE DESCRIPTORS

(71) Applicant: Apple Inc., Cupertino, CA (US)

(72) Inventors: Mohamed Selim Ben Himane, Munich (DE); Daniel Kurz, Sunnyvale, CA (US); Thomas Olszamowski, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/444,404

(22) Filed: Feb. 28, 2017

(65) Prior Publication Data

US 2017/0236033 A1    Aug. 17, 2017

Related U.S. Application Data

(62) Division of application No. 14/417,046, filed as application No. PCT/EP2012/064422 on Jul. 23, 2012.

(51) Int. Cl.
*G06K 9/62* (2006.01)
*G06K 9/46* (2006.01)

(52) U.S. Cl.
CPC ............. *G06K 9/623* (2013.01); *G06K 9/46* (2013.01)

(58) Field of Classification Search
CPC ......... G06T 19/006; G06T 2207/30244; G06T 17/05; G06T 15/06; G06T 13/20
See application file for complete search history.

(56) References Cited

U.S. PATENT DOCUMENTS

| | | | |
|---|---|---|---|
| 2008/0298672 A1* | 12/2008 | Wallack | G06K 9/32 382/154 |
| 2009/0041340 A1 | 2/2009 | Suzuki | |
| 2010/0277572 A1 | 11/2010 | Nakamura | |
| 2011/0194731 A1 | 8/2011 | BenHimane | |

(Continued)

FOREIGN PATENT DOCUMENTS

| | | |
|---|---|---|
| CN | 101138007 A | 3/2008 |
| CN | 101984463 A | 3/2011 |
| EP | 1835460 A1 | 9/2007 |

OTHER PUBLICATIONS

Sergios Theodoridis et al., Pattern Recognition (Second Edition), pp. 106-131, Publishing House of Electronics Industry, Aug. 2004.

(Continued)

*Primary Examiner* — Edward Park
(74) *Attorney, Agent, or Firm* — Blank Rome LLP

(57) ABSTRACT

A method of providing a set of feature descriptors configured to be used in matching an object in an image of a camera is provided. The method includes: a) providing at least two images of a first object; b) extracting in at least two of the images at least one feature from the respective image, c) providing at least one descriptor for an extracted feature, and storing the descriptors; d) matching descriptors in the first set of descriptors; e) computing a score parameter based on the result of the matching process; f) selecting at least one descriptor based on its score parameter; g) adding the selected descriptor(s) to a second set of descriptors; and h) updating the score parameter of descriptors in the first set based on a selection process and to the result of the matching process.

21 Claims, 10 Drawing Sheets

(56) References Cited

U.S. PATENT DOCUMENTS

| | | |
|---|---|---|
| 2012/0218296 A1 | 8/2012 | Belimpasakis |
| 2013/0223730 A1* | 8/2013 | Lee .................. G06K 9/4647 382/165 |
| 2015/0040074 A1 | 2/2015 | Hofmann |

OTHER PUBLICATIONS

"Chapter 5: Feature Selection," In: Theodoridis X and Koutroumbas K: "Pattern Recognition," 1999, Academic Press, pp. 139-179.

Bing Li et al., "Rank-SIFT: Learning to Rank Repeatable Local Interest Points," 2011 IEEE Conference on Computer Vision and Pattern Recognition, Jun. 20, 2011, pp. 1737-1744.

K. Mikolajczyk, T. Tuytelaars, C. Schmid, A. Zisserman, J. Matas, F. Schaffalitzky, T. Kadir, and L. V. Gool, "A comparison of affine region detectors," Int. Journal Computer Vision, 65:43-72, 2005.

Kurz et al., "Gravity-Aware Handheld Augmented Reality," 10th IEEE International Symposium on Mixed and Augmented Reality (ISMAR), Oct. 26, 2011, pp. 111-120.

Lowe, "Distinctive Image Features from Scale-Invariant Keypoints," International Journal of Computer Vision 60 (2), 91-110, 2004.

M. Brown, G. Hua, and S. Winder, "Discriminative Learning of Local Image Descriptors," IEEE Trans. Pattern Anal. Mach. Intell., 33(1):43-57, 2011.

M. Calonder, V. Lepetit, M. Ozuysal, T. Trzcinski, C. Strecha, and P. Fua, "Brief: Computing a Local Binary Descriptor Very Fast," IEEE Trans. Pattern. Anal. Mach. Intell, 34: 1281-1298, 2012.

S. Taylor, E Rosten, and T. Drummond, "Robust Feature Matching in 2.3 ms," In IEEE CVPR Workshop on Feature Detectors and Descriptors, 2009.

V. Lepetit and P. Fua, "Keypoint Recognition Using Randomized Trees," IEEE Trans. Pattern Anal. Mach. Intell, 28 (9):1465-1479, 2006.

Wu, Changchang et al., "3D model matching with Viewpoint-Invariant Patches (VIP)," IEEE Conference on Computer Vision and Pattern Recognition (2008) 0 (2008): 1-8.

Xiubo Geng et al., "Feature Selection for Ranking," Proceedings of the 30th Annual International ACM SIGIR Conference on Research and Development in Information Retrieval, SIGIR '07, Jul. 23, 2007, p. 407.

* cited by examiner

METHOD OF PROVIDING IMAGE FEATURE DESCRIPTORS

This application is entitled to the benefit of, and incorporates by reference essential subject matter disclosed in PCT Application No. PCT/EP2012/064422 filed on Jul. 23, 2012.

BACKGROUND OF THE INVENTION

1. Technical Field

The invention is related to a method of providing a set of feature descriptors configured to be used in matching at least one feature of an object in an image of a camera, and a corresponding computer program product for performing the method.

2. Background Information

Such method may be used among other applications, for example, in a method of determining the position and orientation of a camera with respect to an object. A common approach to determine the position and orientation of a camera with respect to an object with a known geometry and visual appearance uses 2D-3D correspondences gained by means of local feature descriptors, such as SIFT described in D. G. Lowe. Distinctive image features from scale-invariant keypoints. Int. Journal on Computer Vision, 60(2):91-110, 2004. In an offline step, one or more views of the object are used as reference images. Given these images, local features are detected and then described resulting in a set of reference feature descriptors with known 3D positions. For a live camera image, the same procedure is performed to gain current feature descriptors with 2D image coordinates. A similarity measure, such as the reciprocal of the Euclidean distance of the descriptors, can be used to determine the similarity of two features. Matching the current feature descriptors with the set of reference descriptors results in 2D-3D correspondences between the current camera image and the reference object. The camera pose with respect to the object is then determined based on these correspondences and can be used in Augmented Reality applications to overlay virtual 3D content registered with the real object. Note, that analogously the position and orientation of the object can be determined with respect to the camera coordinate system.

Commonly, both feature detectors and feature description methods need to be invariant to changes in the viewpoint up to a certain extent Affine-invariant feature detectors as described in K. Mikolajczyk, T. Tuytelaars, C. Schmid, A. Zisserman, J. Matas, F. Schaffalitzky, T. Kadir, and L. V. Gool. A comparison of affine region detectors. Int. Journal Computer Vision, 65:43-72, 2005. that estimate an affine transformation to normalize the neighborhood of a feature exist, but they are currently too expensive for real-time applications on mobile devices. Instead, usually only a uniform scale factor and an in-plane rotation is estimated resulting in true invariance to these two transformations only. The feature description methods then use the determined scale and orientation of a feature to normalize the support region before computing the descriptor. Invariance to out-of-plane rotations, however, is usually fairly limited and in the responsibility of the description method itself.

If auxiliary information is available, this can be used to compensate for out-of-plane rotations. Provided with the depth of the camera pixels, the 3D normal vector of a feature can be determined to create a viewpoint-invariant patch, as described in C. Wu, B. Clipp, X. Li, J.-M. Frahm, and M. Pollefeys. 3d model matching with viewpoint-invariant patches (VIP). In Proc. IEEE CVPR, 2008, of the feature. For horizontal surfaces, the gravity vector measured with inertial sensors enables the rectification of the camera image prior to feature description, as described in D. Kurz and S. Benhimane Gravity-Aware Handheld Augmented Reality. In Proc. IEEE/ACM ISMAR, 2011.

If such data is not available, rendering techniques, such as image warping, can be employed to create a multitude of synthetic views, i.e. images, of a feature. For descriptors providing a low invariance to viewpoint variations or in-plane rotations but enabling very fast descriptor matching, such synthetic views are used to create different descriptors for different viewpoints and/or rotations to support larger variations, as described in S. Taylor, E. Rosten, and T. Drummond. Robust feature matching in 2.3 ms. In IEEE CVPR Workshop on Feature Detectors and Descriptors, 2009; M. Calonder, V. Lepetit, M. Ozuysal, T. Trzcinski, C. Strecha, and P. Fua. Brief: Computing a local binary descriptor very fast. IEEE Trans. Pattern Anal. Mach. Intell, 34:1281-1298, 2012.

However, with an increasing number of reference feature descriptors, the time to match a single current feature descriptor increases, making real-time processing impossible at some point. Additionally, the amount of reference data, which potentially needs to be transferred via mobile networks, increases which results in longer loading times.

However, with an increasing number of reference feature descriptors, the time to match a single current feature descriptor increases, making real-time processing impossible at some point. Additionally, the amount of reference data, which potentially needs to be transferred via mobile networks, increases which results in longer loading times.

In addition to invariance to spatial transformations resulting from a varying viewpoint, it is also crucial that feature descriptors (and feature classifiers) provide invariance to changes in illumination, noise and other non-spatial transformations. Approaches exist, that employ learning to find ideal feature descriptor layouts within a defined design space, as described in M. Brown, G. Hua, and S. Winder. Discriminative learning of local image descriptors. IEEE Trans. Pattern Anal. Mach. Intell. 33(1):43-57, 2011, based on a ground truth dataset containing corresponding image patches of features under greatly varying pose and illumination conditions. Analogically, classifiers can be provided with warped patches that additionally contain synthetic noise, blur or similar in the training phase. Thanks to the training stage provided with different appearances of a feature, classifiers in general provide a good invariance to the transformations that were synthesized during training. However, the probabilities that need to be stored for feature classifiers require a lot of memory, which makes them unfeasible for a large amount of features in particular on memory-limited mobile devices.

Using different synthetic views, i.e. images, of an object to simulate different appearances has shown to provide good invariance to out-of-plane rotations. However, the existing methods making use of this result in large amount of descriptor data making them almost unfeasible on mobile devices.

It would therefore be beneficial to provide a method of providing a set of feature de-scriptors which is capable of being used in methods of matching features of an object in an image of a camera applied on devices with reduced memory capacities.

SUMMARY OF THE INVENTION

Aspects of the invention are provided according to the independent claims.

According to an aspect, there is disclosed a method of providing a set of feature de-scriptors configured to be used in matching at least one feature of an object in an image of a camera, comprising the steps of: a) providing at least two images of a first object or of multiple instances of a first object, wherein the multiple instances provide different appearances or different versions of an object, b) extracting in at least two of the images at least one feature from the respective image, c) providing at least one descriptor for an extracted feature, and storing the descriptors for a plurality of extracted features in a first set of descriptors, d) matching a plurality of the descriptors of the first set of descriptors against a plurality of the descriptors of the first set of descriptors, e) computing a score parameter for a plurality of the descriptors based on the result of the matching process, f) selecting among the descriptors at least one descriptor based on its score parameter in comparison with score parameters of other descriptors, g) adding the selected descriptor to a second set of descriptors, h) updating the score parameter of a plurality of the descriptors in the first set of de-scriptors according to any preceding selection process and to the result of the matching process i) performing steps f) and g) again wherein the second set of descriptors is configured to be used in matching at least one feature of the first object or of a second object in an image of a camera.

The term "view" of an object means an image of an object which can either be captured using a real camera or synthetically created using an appropriate synthetic view creation method, as explained in more detail later.

Our method in general creates a first set of descriptors and then adds descriptors from the first set of descriptors to a second set of descriptors. It is known to the expert, that this can be implemented in many different ways and does not necessarily mean that a descriptor is physically copied from a certain position in memory in the first set to a different location in memory in the second set of descriptors. Instead, the second set can for example be implemented by marking descriptors in the first set to be part of the second set, e.g. by modifying a designated parameter of the descriptor. Another possible implementation would be to store memory addresses, pointers, references, or indices of the descriptors belonging to the second set of descriptors without modifying the descriptor in memory at all.

Particularly, according to an embodiment, there is presented a method to automatically determine a set of feature descriptors that describes an object such that it can be matched and/or localized under a variety of conditions. These conditions may include changes in viewpoint, illumination, and camera parameters such as focal length, focus, exposure time, signal-to-noise-ratio, etc. Based on a set of, e.g. synthetically, generated views of the object, preferably under different conditions, local image features are detected, described and aggregated in a database. The proposed method evaluates matches between these database features to eventually find a reduced, preferably minimal set of most representative descriptors from the database. Using this scalable offline process, the matching and/or localization success rate can be significantly increased without adding computational load to the runtime method.

For example, steps h) and i) are repeatedly processed until the number of descriptors in the second set of descriptors has reached a particular value or the number of descriptors in the second set of descriptors stops varying.

According to an embodiment, step g) may be preceded by modifying the at least one selected descriptor based on the selection process.

For example, the modification of the selected descriptor comprises updating the descriptor as a combination of the selected descriptor and other descriptors in the first set of descriptors.

According to an embodiment, the usage of the result of the matching process in the update step h) is restricted to the result of the matching process of the least one selected descriptor, or the result of the matching process of the descriptors that match with the at least one selected descriptor.

According to another aspect of the disclosure, there is provided a method of providing at least two sets of feature descriptors configured to be used in matching at least one feature of an object in an image of a camera, comprising the steps of: a) providing at least two images of a first object or of multiple instances of a first object, wherein the multiple instances provide different appearances or different versions of an object, wherein each of the images is generated by a respective camera having a known orientation with respect to gravity when generating the respective image, b) extracting in at least two of the images at least one feature from the respective image, c) providing at least one descriptor for an extracted feature, and storing the descriptors for a plurality of extracted features in multiple sets of descriptors with at least a first set of descriptors and a second set of descriptors, wherein the first set of descriptors contains descriptors of features which were extracted from images corresponding to a first orientation zone with respect to gravity of the respective camera, and the second set of descriptors contains descriptors of features which were extracted from images corresponding to a second orientation zone with respect to gravity of the respective camera, d) matching a plurality of the descriptors of the first set of descriptors against a plurality of the descriptors of the first set of descriptors, and matching a plurality of the descriptors of the second set of descriptors against a plurality of the descriptors of the second set of descriptors, e) computing a score parameter for a plurality of the descriptors based on the result of the matching process, f) selecting within the first set of descriptors at least one descriptor based on its score parameter in comparison with score parameters of other descriptors, and selecting within the second set of descriptors at least another descriptor based on its score parameter in comparison with score parameters of other descriptors, g) adding the at least one selected descriptor from the first set to a third set of descriptors and adding the at least one selected descriptor from the second set to a fourth set of descriptors, h) updating the score parameter of a plurality of descriptors in the first and/or second set of descriptors according to any preceding selection process and to the result of the matching process i) performing steps f) and g) again wherein the third and/or fourth set of descriptors are configured to be used in matching at least one feature of the first object or of a second object in an image of a camera.

Thus, if, e.g., camera localization is performed with respect to objects at a known orientation of the camera with respect to gravity, it is proposed to create multiple reference descriptor sets for different orientation zones of the camera. For example, different angles between camera rays and a measured gravity vector may be used, as set out in more detail below. This approach is particularly suited for handheld devices with built-in inertial sensors (which may be used to measure an orientation with respect to gravity) and enables matching against a reference dataset only containing the information relevant for camera poses that are consistent with the measured orientation.

Therefore, the presented approach aims at benefiting from multiple, e.g. synthetic, views of an object without increasing the memory consumption. The method (which may be implemented as so-called offline method which does not need to run when running the application) therefore first creates a larger database of descriptors from a variety of views, i.e. images of the object, and then determines a preferably most representative subset of those descriptors which enables matching and/or localization of the object under a variety of conditions.

For example, steps h) and i) are repeatedly processed until the number of descriptors in the third and/or fourth set of descriptors has reached a particular value or the number of descriptors in the third and/or fourth set of descriptors stops varying.

According to an embodiment, step g) is preceded by modifying the at least one selected descriptor based on the selection process.

For example, the modification of the selected descriptor comprises updating the descriptor as a combination of the selected descriptor and other descriptors in the first or second set of descriptors.

For example, in the above methods, steps h) and i) are processed iteratively multiple times until the number of descriptors stored in the second, third and/or fourth set of descriptors has reached a particular value.

According to an embodiment, step d) includes determining for each of the descriptors which were matched whether they were correctly or incorrectly matched, and step e) includes computing the score parameter dependent on whether the descriptors were correctly or incorrectly matched.

For example, the score parameter is indicative of the number of matches the respective descriptor has been correctly matched with any other of the descriptors. Then, in step f) at least one descriptor with a score parameter indicative of the highest number of matches within the first set of descriptors is selected, and step h) reduces the score parameter of the at least one selected descriptor and the score parameter of the descriptors that match with the at least one selected descriptor.

According to another aspect of the invention, there is disclosed a method of matching at least one feature of an object in an image of a camera, comprising providing at least one image with an object captured by a camera, extracting current features from the at least one image and providing a set of current feature descriptors with at least one current feature descriptor provided for an extracted feature, providing a second set of descriptors according to the method as described above, and comparing the set of current feature descriptors with the second set of descriptors for matching at least one feature of the object in the at least one image.

According to further aspect of the invention, there is disclosed a method of matching at least one feature of an object in an image of a camera, comprising providing at least one image with an object captured by a camera, extracting current features from the at least one image and providing a set of current feature descriptors with at least one current feature descriptor provided for an extracted feature, providing a third and a fourth set of descriptors according the method as described above, and comparing the set of current feature descriptors with the third and/or fourth set of descriptors for matching at least one feature of the object in the at least one image.

For example, the method may further include determining a position and orientation of the camera which captures the at least one image with respect to the object based on correspondences of feature descriptors determined in the matching process. For instance, the method may be part of a tracking method for tracking a position and orientation of the camera with respect to an object of a real environment.

According to an embodiment, the method of providing a set of feature descriptors is applied in connection with an augmented reality application and, accordingly, is a method of providing a set of feature descriptors configured to be used in localizing an object in an image of a camera in an augmented reality application.

According to an embodiment, the method of matching at least one feature of an object in an image of a camera is applied in an augmented reality application and, accordingly, is a method of localizing an object in an image of a camera in an augmented reality application.

For example, step a) of the above method includes providing the different images of the first object under different conditions which includes changes from one of the images to another one of the images in at least one of the following: viewpoint, illumination, camera parameters such as focal length, focus, exposure time, signal-to-noise-ratio.

According to an embodiment, step a) may include providing the multiple images of the first object by using a synthetic view creation algorithm creating the multiple images by respective virtual cameras as respective synthetic views. Alternatively, one or more of the multiple images may be generated by a real camera.

For example, the synthetic view creation algorithm includes a spatial transformation which projects a 3D model onto the image plane of a respective synthetic view, and a rendering method is applied which is capable to simulate properties of a real camera, particularly such as defocus, motion blur, noise, exposure time, brightness, contrast, and to also simulate different environments, particularly such as by using virtual light sources, shadows, reflections, lens flares, blooming, environment mapping.

According to an embodiment, step c) includes storing the descriptor for an extracted feature together with an index of the image from which the feature has been extracted.

Particularly, the above described methods are performed on a computer system which may have any desired configuration. Advantageously, as a result of reducing the size of the set of descriptors, the methods using such reduced set of descriptors are capable of being applied on mobile devices, such as mobile phones, which have only limited memory capacities.

In another aspect, there is provided a computer program product adapted to be loaded into the internal memory of a digital computer system, and comprising software code sections by means of which the steps of a method as described above are performed when said product is running on said computer system.

BRIEF DESCRIPTION OF THE DRAWINGS

Further advantageous features, embodiments and aspects of the invention are described with reference to the following Figures, in which.

DESCRIPTION

Figure 1:
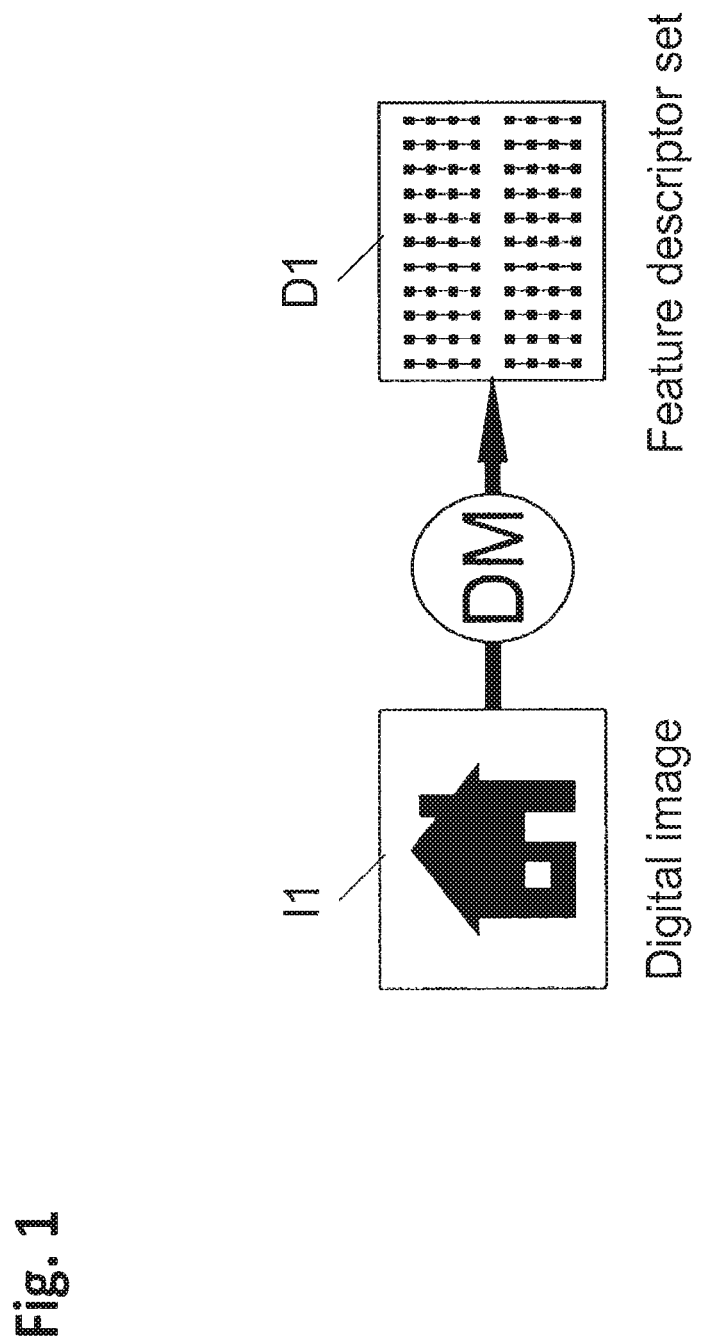
FIG. 1 shows a feature description method according to an embodiment.

Generally, many applications in the field of computer vision require localizing one or more features of an object in an image of a camera, e.g. for object recognition or for determining a position and orientation of the camera. Such applications usually include finding corresponding points or other features in two or more images of the same scene or object under varying viewpoints, possibly with changes in illumination and capturing hardware used. The features can be points, or a set of points (lines, segments, regions in the image or simply a group of pixels, a patch, or any set of pixels in an image). Example applications include narrow and wide-baseline stereo matching, camera pose estimation, image retrieval, object recognition, and visual search.

For example, Augmented Reality Systems permit the superposition of computer-generated virtual information with visual impressions of a real environment. To this end, the visual impressions of the real world, for example captured by a camera in one or more images, are mixed with virtual information, e.g., by means of a display device which displays the respective image augmented with the virtual information to a user. Spatial registration of virtual information and the real world requires the computation of the camera pose (position and orientation) that is usually based on feature correspondences.

Typically, one or more views of an object are used as reference images. Given these views, which are images of the object, local features may be detected and then described. Such views may be generated in an offline step by a virtual camera (generating so-called synthetic views, as set out in more detail below) or by a real camera. According to an aspect of the invention, there are provided at least two views of a first object or of multiple instances of a first object.

For example, the first object may be a 1 dollar bill. This 1 dollar bill may be viewed by a camera from different perspectives and respective views captured by a virtual or real camera may be generated. Accordingly, in this way multiple views of the 1 dollar bill are provided.

Multiple instances of an object, as mentioned above, may provide different appearances or different versions of an object. For example, the 1 dollar bill may be captured under various different conditions, such as different light conditions or other different environmental conditions, and/or may be warped in a certain way by a warping function, thus resulting in images with different appearances of the 1 dollar bill. Additionally, such different appearances of the object may be viewed from different perspectives. According to a further embodiment, also different versions of the 1 dollar bill may be captured in different images. For example, multiple 1 dollar bills with different wrinkles, stains, drawings, etc. may be captured in the different images. These images accordingly depict different versions of an object, in the present case of a 1 dollar bill. Again, such different versions may also be viewed from different perspectives.

By means of the first object or of multiple instances of the first object, at least part of it such as its 3D dimensions being known to the system, local features in another image showing the first object or a second object which corresponds somehow to the first object may be detected and then described.

Generally, in the multiple views or reference images, as described above, features are detected and then described resulting in a set of reference feature descriptors with known 3D positions resulting from the known 3D properties of the reference object. For a live camera image, the same procedure is performed to gain current feature descriptors with 2D image coordinates. A similarity measure, such as the reciprocal of the Euclidean distance of the descriptors, can be used to determine the similarity of two features. Matching the current feature descriptors with the set of reference feature descriptors results in 2D-3D correspondences between the current camera image and the reference object (in the above example, the first object such as the 1 dollar bill). The camera pose with respect to the real object in the live camera image is then determined based on these correspondences and can be used in Augmented Reality applications to overlay virtual 3D content registered with the real object. Note, that analogously the position and orientation of the object can be determined with respect to the camera coordinate system.

In the following, embodiments and aspects of the invention will be described in more detail with reference first to FIGS. 1 to 5.

FIG. 1 shows a feature description method according to an embodiment. Particularly, it shows a high-level flowchart diagram of a feature description method, as already referred to above. A digital image I1 acts as an input to a description method DM which outputs a set of feature descriptors D1 for the image It For example, the image I1 may be a view generated by a synthetic camera, i.e. a synthetic view depicting a virtual object, or may be a view captured by a real camera which depicts a real object. The description method DM, for which standard methods known in the art may be used, extracts in the image or view I1 at least one feature from the image or view, provides a descriptor for an extracted feature, and stores the descriptors for a plurality of extracted features in the set of descriptors D1. The aim is to create a descriptor for each extracted feature that enables the comparison and therefore matching of features. For example, requirements for a good descriptor are distinctiveness, i.e. different feature points result in different descriptors, invariance to changes in viewing direction, rotation and scale, changes in illumination, and/or image noise.

Figure 2:
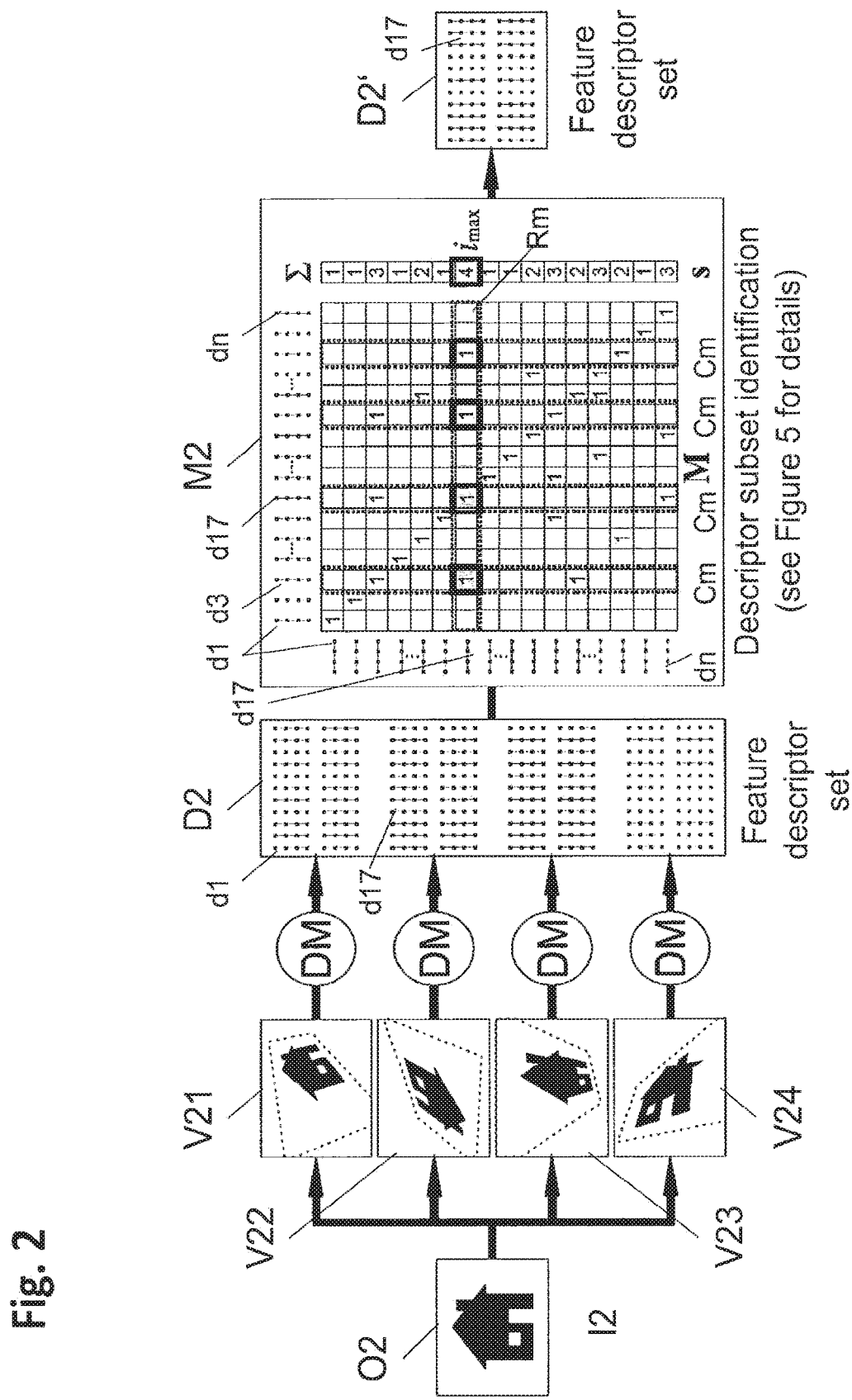
FIG. 2 shows a feature description method according to an embodiment of the invention, in particular with respect to multiple views of a planar object.

FIG. 2 shows a feature description method according to an embodiment of the invention, in particular with respect to multiple views of a planar object. Particularly, FIG. 2 depicts an embodiment of the method according to the invention in a high-level flowchart diagram for a planar object. Details thereof will be more evident when viewed in connection with the flow diagram of FIG. 5.

Generally, according to an aspect there is provided a method to automatically determine a set of feature descriptors for a given object such that it can be matched and/or localized in a camera image under a variety of conditions. These conditions may include changes in viewpoint, illumination, and camera parameters such as focal length, focus, exposure time, signal-to-noise-ratio, etc. The method aims at finding a relatively small set of descriptors, as the computational time needed for descriptor matching increases with the number of reference descriptors. For arbitrary objects, the method may use a model allowing for the creation of synthetic views, e.g. a textured triangle mesh or a point cloud with associated intensity information. For planar objects, a fronto-parallel image of the object is fully sufficient and synthetic views, resulting in images captured by virtual cameras, can be created using image warping.

The method starts with providing at least two images of a first object or of multiple instances of a first object, wherein the multiple instances may provide different appearances or different versions of the first object, as described in more detail above. For example, given a model of a first object O2, which in this case is represented in a digital view or image 12 (the terms view and image are used interchangeably herein), a multitude of synthetic views V21, V22, V23, V24 of the first object O2 is created. In a next step, in at least two of the views V21-V24 at least one feature from the respective view is extracted by a description method providing a descriptor for an extracted feature. The descriptors for a plurality of extracted features are stored in a first set of descriptors D2. Particularly, each view or image is fed into a description method DM resulting in a plurality of subsets of feature descriptors which are aggregated in the first set of descriptors D2. As schematically shown in FIG. 2, each descriptor d1-dn is represented by a descriptor vector having multiple parameters which describe the respective extracted feature. The method then proceeds with matching a plurality of the descriptors d1-dn of the first set of descriptors D2 against a plurality of the descriptors d1-dn of the first set of descriptors D2 in a matching process performed in a descriptor subset identification method M2. For example, each correct match of descriptors d is marked with a "1" in the matrix as shown. Of course, there are also other possibilities of marking matches in a database. In the present example, for instance descriptors d3 and d17 are found to correctly match one another, which is marked with a corresponding "1" in the matrix.

In a further step, a score parameter is assigned to a plurality of the descriptors d1-dn as a result of the matching process. For example, a score parameter s=4 is assigned to the descriptor d17 since it was found to match with 4 descriptors of the set of descriptors D2. The score parameter may be any kind of parameter which is indicative of the number of matches the respective descriptor has been correctly matched with any other of the descriptors. Other possibilities of defining a score parameter instead of number of matches may be the smallest distance to a descriptor over all descriptors or the average similarity over all matched descriptors.

In a next step, among the descriptors at least one descriptor is selected based on its score parameter in comparison with score parameters of other descriptors. The selected descriptor is then stored in a second set of descriptors D2'. For example, descriptor d17 which has been identified as the descriptor with the highest score parameter s is selected and stored in the second set of descriptors D2'. In the present embodiment, the highest score parameter is indicative of a high significance of the descriptor d17. Accordingly, in other embodiments where the score parameter is determined differently, a descriptor with a score parameter should be selected which is indicative of a higher significance of the respective descriptor compared to other descriptors.

Thereafter, the score parameter s of the selected descriptor (i.e. of descriptor d17 in the present example) is modified in the first set of descriptors D2. For example, the score parameter s for descriptor d17 may be decreased to 3, 2, 1 or 0 (thus, reducing its significance for a following selection step). Alternatively, the selected descriptor (such as d17) may be designated in the first set of descriptors D2 such that the selected descriptor is disregarded for selection in a following selection step. For example, the selected descriptor (such as d17) may be marked irrelevant or marked to be removed from the database so that it is disregarded for selection in a following selection step.

The steps of selecting a descriptor and modifying the score parameter or designating the selected descriptor, as described above, are processed repeatedly multiple times, thereby storing in the second set of descriptors D2' a number of selected descriptors d which is lower than the number of descriptors d stored in the first set of descriptors D2. Accordingly, the proposed method determines a set of descriptors D2' out of D2 which provides the most matches between different descriptors d in D2, i.e. the most significant descriptors of D2, and therefore is expected to be representative for describing the object O2 under varying viewpoints and conditions. Thus, such second set of descriptors D2' may be used in matching and/or localizing at least one feature of the object O2 or of a second object, preferably similar to object O2, in another image of a camera.

Figure 3:
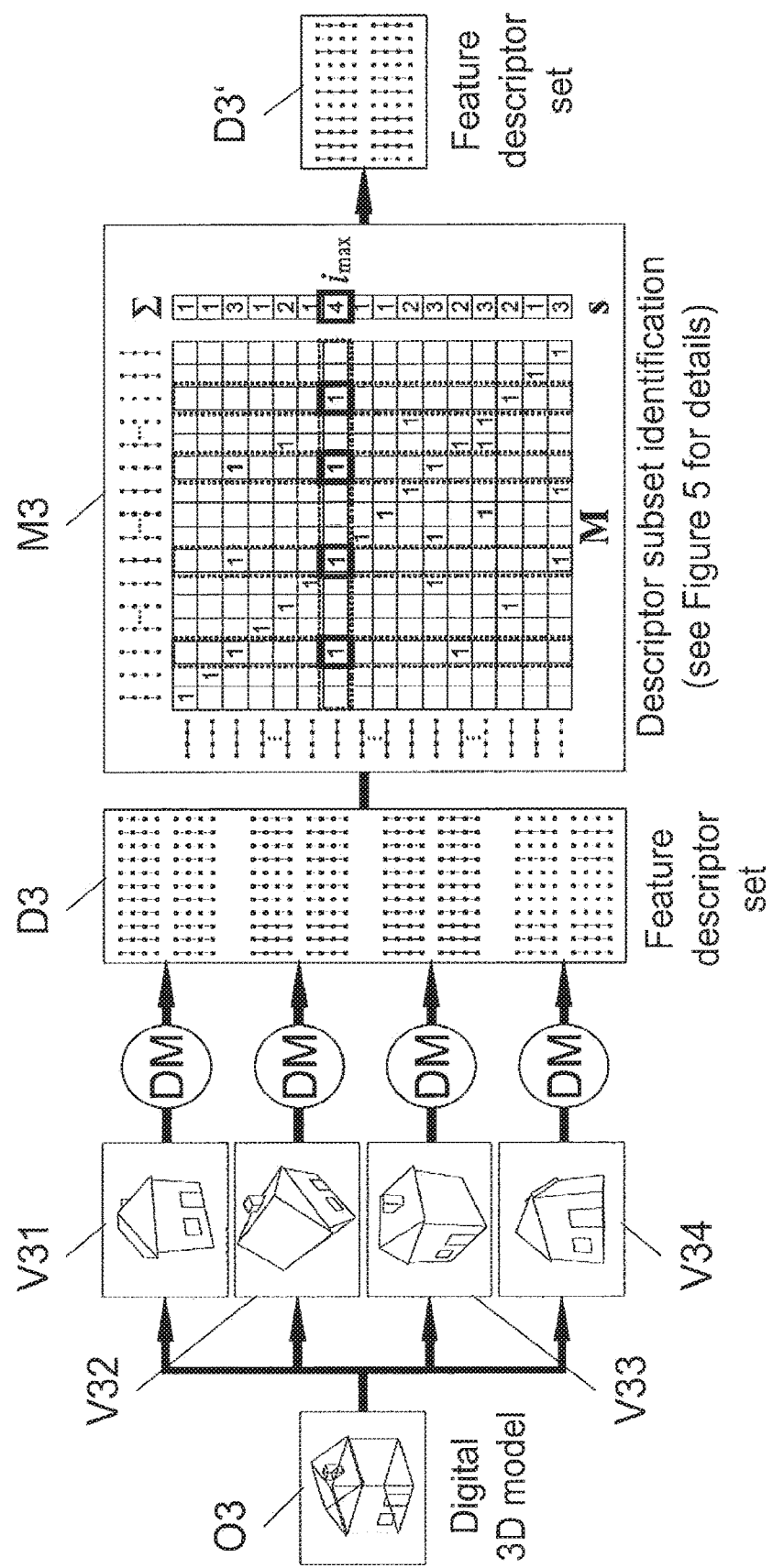
FIG. 3 shows a feature description method according to an embodiment of the invention, in particular with respect to multiple views of a general 3D object.

FIG. 3 shows a feature description method according to a similar embodiment, but in particular with respect to multiple views of a general 3D object. Particularly, FIG. 3 illustrates the same method as shown in FIG. 2, but for a general 3D object O3 instead of a planar object. The synthetic views V31, V32, V33, V34 are in this case created by rendering the digital 3D model O3 under a variety of conditions. In the same fashion as explained for FIG. 2, the descriptors from all views are collected in a first set of descriptors D3, matched in the descriptor subset identification method M3 which iteratively determines the best descriptors and collects them in a second set of descriptors D3'.

Figure 4:
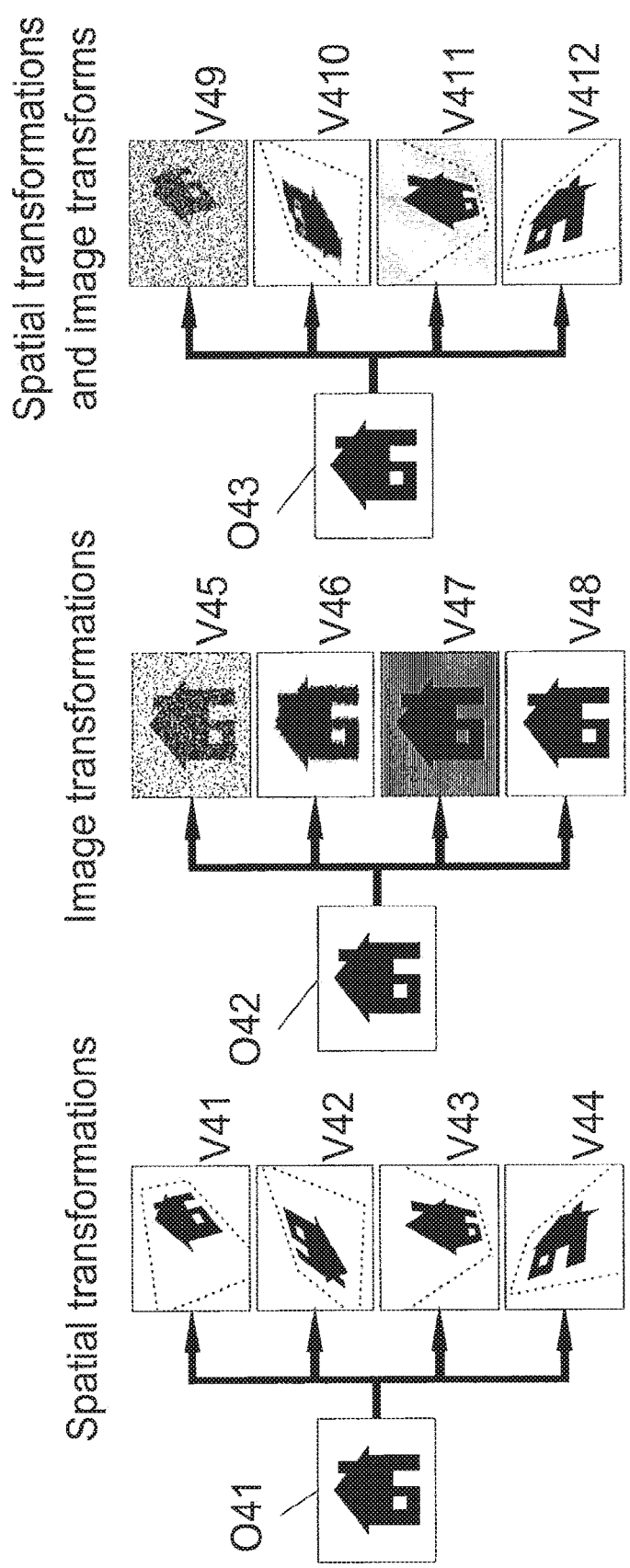
FIG. 4 shows different exemplary embodiments of a synthetic view creation method.

According to an aspect, FIG. 4 shows different exemplary embodiments of a synthetic view creation method. Particularly, FIG. 4 illustrates some examples for the method to create synthetic views of an object based on a model of the object. The figure uses planar objects, but all examples apply analogously also for general 3D objects. For example, the synthetic views are created for an object O41 by means of spatial transformations only resulting in the views V41, V42, V43, V44 showing the object O41 from different perspectives. In another example, a digital image of the object O42 only undergoes non-spatial transformations resulting in the synthetic views V45, V46, V47, V48. These views involve different appearances of the object O42 according to the respective transformation, but from the same perspective Finally, in another example, both spatial and non-spatial transformations are used to create the synthetic views V49, V410, V411, V412 for the object O43, again resulting in different appearances of the object O43, but in addition with different perspectives. Obviously, also any combination of the three cases can be used, i.e. some synthetic views use spatial transformations only, other use non-spatial transformations only and some us a combination of both.

Figure 5:
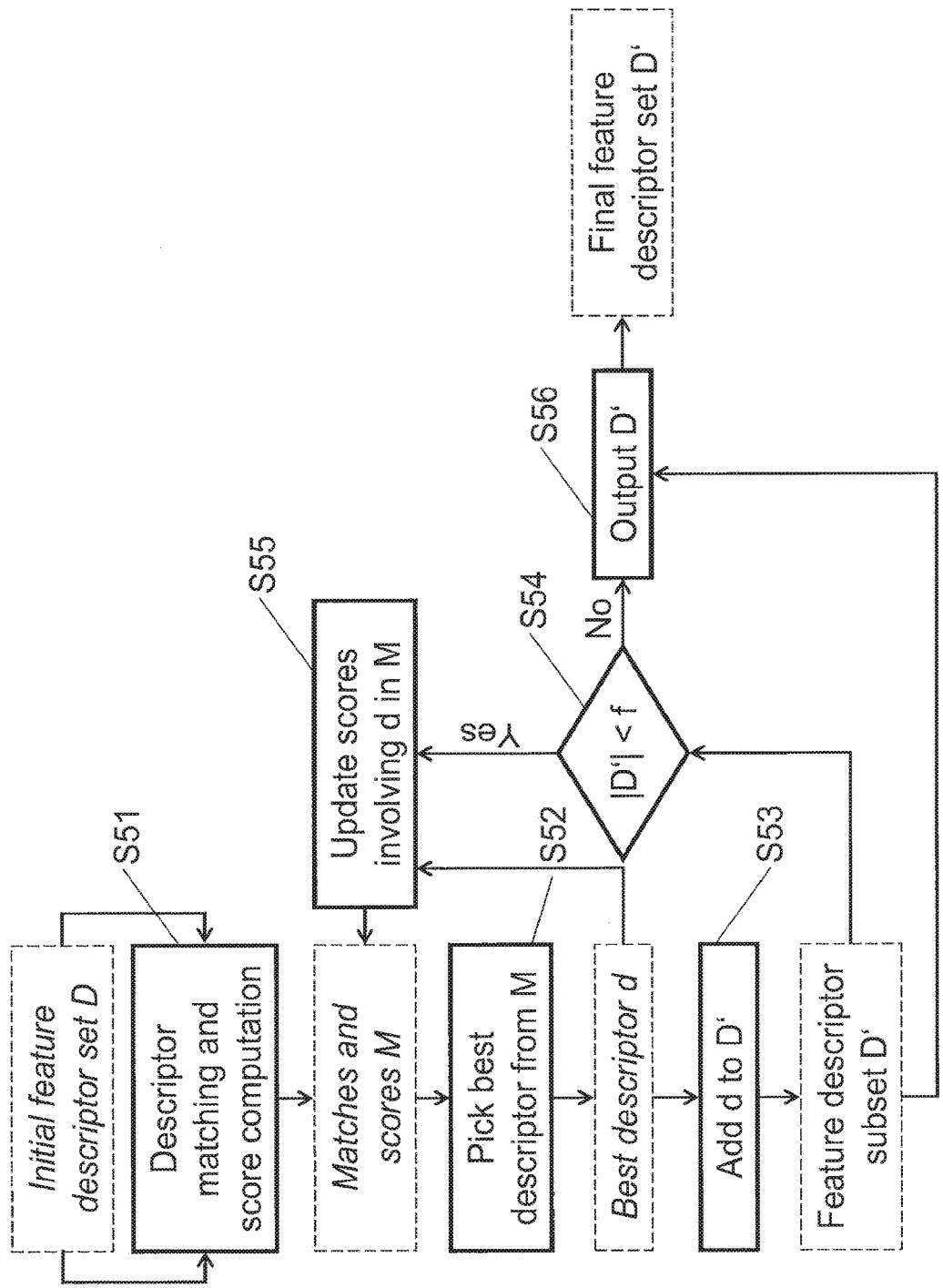
FIG. 5 shows a descriptor subset identification method according to an embodiment of the invention.

FIG. 5 shows a more detailed flow diagram of a method according to an embodiment of the invention, the principles of which have been described above in connection with FIG.

2. Particularly, FIG. 5 shows an iterative descriptor subset identification algorithm that determines a final set of descriptors D' given an initial set of descriptors D. For example, the set of descriptors D corresponds to the set of descriptors D2 and the set of descriptors D' corresponds to the set of descriptors D2' as described with reference to FIG. 2.

Again, the method starts with providing multiple views of a first object or of multiple instances of a first object, wherein the multiple instances provide different appearances or different versions of an object, extracting in the views at least one feature from the respective view, providing a respective descriptor for an extracted feature, and storing the descriptors for a plurality of extracted features in the first set of descriptors D. These steps are not shown in FIG. 5.

The method continues in that, in a following step S51, the descriptors of D are matched against each subset of descriptors in D resulting from one synthetic view. Particularly, a plurality of the descriptors of the first set of descriptors D is matched against a plurality of the descriptors of the first set of descriptors D. For example, all of the descriptors of the first set of descriptors D are matched against all of the descriptors of the first set of descriptors D.

Only the correct matches M, i.e. those where the two matched descriptors describe two physical points that are spatially close to each other, are kept. The iterative method selects the best descriptor d from the correct matches M in step S52, in the present embodiment the descriptor d with the highest score parameter s, which descriptor d is then added to the second set of descriptors D' in step S53. In FIG. 2, the descriptor d with the highest score parameter s is designated "imax" (having the highest number of matches). After each iteration, step S54 determines if D' contains less descriptors than the desired amount f of descriptors. If yes, step S55 updates the score parameter s of matches involving the previously selected descriptor d in M and then proceeds with selection of the next best descriptor from M in step S52. Otherwise, if no, i.e. if the desired amount f of descriptors in D' is reached, D' is out-putted in step S56 as final feature descriptor set. This outputted second set of descriptors D' is configured to be used in matching and/or localizing at least one feature of the first object or of a second object in an image of a camera, for example in a live camera image of an augmented reality application.

A corresponding method of matching at least one feature of an object in an image of a camera comprises providing at least one image (for example, a live camera image of an augmented reality application) with an object captured by a camera, extracting current features from the at least one image and providing a set of current feature descriptors with at least one current feature descriptor provided for an extracted feature. The set of current feature descriptors is then matched with the second set of descriptors D' for matching and/or localizing at least one feature of the object in the at least one image, e.g. live camera image.

According to an embodiment, the proposed method of providing a set of feature de-scriptors comprises a synthetic view creation algorithm which is composed of two parts. First a spatial transformation projects the 3D model of an object to be rendered onto the image plane of a synthetic view. This transformation can be any kind of transformation including rigid body transformations, parallel projection, perspective projection, non-linear transformations and any combination of those. It is meant to simulate properties of a virtual camera such as its position, orientation, focal length, resolution, skew and radial distortions (e.g. barrel distortion, pincushion distortion). Afterwards a rendering method is applied to simulate properties of a real camera such as defocus, motion blur, noise, exposure time, brightness, contrast, and also simulating different environments using virtual light sources, shadows, reflections, lens flares, blooming, environment mapping, etc., resulting in a respective synthetic view, which is a digital image. It should be noted that the spatial transformation for every synthetic view is known and invertible, i.e. the 3D position of every pixel in every view can be easily computed.

Using the above-mentioned method, a set of synthetic views of the object is created (irrespective of whether it is planar or not). For each such view, image features are detected and described using a feature description method (DM) and all descriptors are aggregated together with the indices of the view they originate from in a database set of descriptors with view indices. For every descriptor the 3D position of the feature on the model that it corresponds to is determined and saved with the descriptor. In principle, such descriptor database set enables a very good localization of the object in another view, e.g. in a live camera image, under conditions similar to those that were used to create the synthetic views. However, when using many synthetic views, the resulting set of descriptors contains many descriptors to match against, which number of descriptors may be too high for a mobile device with limited memory capacity or a real-time application. Therefore the method according to the invention is looking for a subset of these descriptors that provides a sufficient amount of descriptor matches among the synthetic views. The assumption is that this subset will also allow for matching and/or localization of the object in a camera image under a variety of conditions, but has only a reduced number of descriptors.

According to a particular embodiment, the method first matches every descriptor in the initial set of descriptors against all subsets of descriptors from every synthetic view. Note that the matching procedure does not necessarily find a match for every descriptor as it may for instance require a minimal similarity between two descriptors or the most similar descriptor needs to be significantly closer than the second closest descriptor. After having matched all descriptors in the database, all wrong matches are discarded, e.g. where the 3D position of the corresponding features on the model differs by more than a threshold. For all remaining (correct) matches, the feature positions can be optionally updated as the average over all matched features, which results in a more precise position.

The iterative descriptor subset identification method then first determines the descriptor with the highest score parameter within the database descriptor set, as described above. Thereby the score parameter corresponds to how "good" a descriptor is. This can be defined in different ways, e.g. as the number of matches for a descriptor or as the sum over the similarities with all other descriptors. The best descriptor (d), with the highest score parameter, is then added to the final set of descriptors (D').

According to an embodiment, the process of adding the best descriptor to the final set of descriptors can be preceded by modifying this descriptor based on the selection process. For example, the descriptor can be modified such that it corresponds to the weighted average over itself and all descriptors it matches with.

In an embodiment where descriptor selection, adding the descriptor to a second set and updating of the score parameters is repeatedly processed, the additional update of the selected descriptor as described above is performed in every iteration.

It is advantageous for the scalability of the method, i.e. that it can deal with a large amount of synthetic views, if the method afterwards updates the score parameters not only of the selected (best) descriptor d, but also of other descriptors that the descriptor d matches with, that match with descriptor d and/or that match with descriptors that descriptor d matches with according to the selection process. This is shown in FIGS. 2 and 3 as an example for descriptor d17: In the modifying step, the row Rm with matches of descriptor d17 as well as the columns Cm with matches of descriptors the descriptor d17 matches with are modified in the step S55 (what is described in FIG. 5 with "Update matches involving d in M", in the present example: "Update matches involving d17 in M"). Particularly, the respective "1"s in the row RM and columns Cm are set to indicate "no match", e.g. removed or replaced by "0". This automatically modifies the score parameters s in the column "E" (sum of matches in the respective row).

For other definitions of the score parameter, this update of the score parameter according to any preceding selection process and to the result of the matching process is implemented accordingly. If the score parameter for example corresponds to the smallest distance to a descriptor over all descriptors or the average similarity over all matched descriptors, then the update would modify the score parameter such that the modified value is indicative of the selected descriptor(s), and possibly the descriptors it matches with, being more distant from the rest of the descriptors in the set.

If an object has a very prominent feature that is visible in many of the multiple views and its appearance is particularly invariant, then it is likely that many of the descriptors with the highest score parameters correspond to this single feature. To avoid having all these in the final set of descriptors D', the score parameters of these descriptors are modified before starting the next iteration or recursion loop. This reduces their significance for following selection steps. For example, the score parameters are chosen such that they are indicative of the number of matches within the first set of descriptors. Accordingly, the score parameter of the selected descriptor is modified so that the modified score parameter is indicative of a reduced number of matches. In the present embodiment, the score parameter is increased with increasing number of matches and is decreased when modified.

In the next iteration or recursion loop, again the descriptor with the highest score parameter is determined and added to the set of descriptors D'. As described above, this procedure is repeated until the final set of descriptors D' has a desired size. Finally, D' can be used in the same way as regular feature descriptors (e.g. of set D) would be used, e.g. for matching, camera localization, object localization, or structure from motion.

In the following, another aspect of the invention is described with reference to FIGS. 6 to 10. Basic principles of this aspect correspond to aspects as described with reference to FIGS. 1 to 5, so that any specifics referring thereto will not be explained in much detail again.

Figure 6:
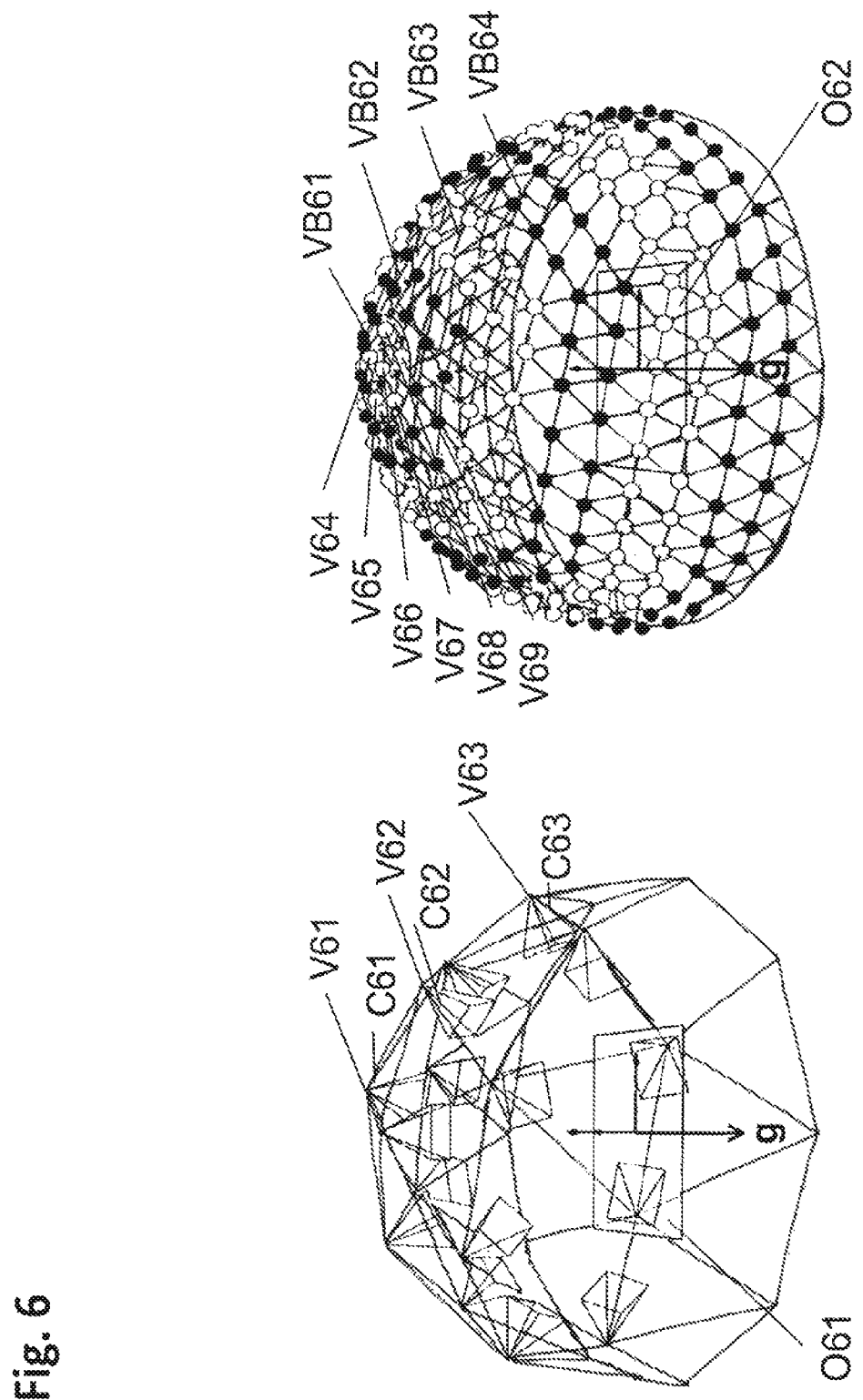
FIG. 6 shows an aspect of a feature description method according to an embodiment, particularly a so-called globally gravity-aware method.

FIG. 6 shows an aspect of a feature description method according to an embodiment of this aspect, particularly a so-called globally gravity-aware method, in which it is proposed to create multiple representative feature descriptor sets for different camera orientation zones with respect to gravity, as explained in more detail below. More specifically, FIG. 6 shows for a planar object O61 multiple virtual cameras, such as virtual cameras C61, C62, C63 located on a hemisphere centered around the object O61. The cameras C61, C62, C63 are located in a way that they capture the object O61 from different views, resulting in the respective views V61, V62, V63. That is, camera C61 captures the object O61 and generates view V61, and so on. The aperture angle of the camera is depicted by a respective pyramid.

For a planar object O62, FIG. 6 illustrates a possible layout of camera centers of virtual cameras (shown by a respective circle) for creating the synthetic views V64, V65, V66, etc. In the following explained globally gravity-aware method, these views are sorted to so-called view bins according to the orientation of the respective camera with respect to gravity, for example according to the angle between the respective virtual camera's principal axis and the gravity vector g. Note that the terms "view bin" and "orientation zone" have the same meaning and are therefore interchangeable hereafter. The different view bins VB61, VB62, VB63, VB64, etc. are illustrated using filled and outlined circles. For instance, the view bin VB61 comprises the views V64, V65, V66, V67, V68 and V69 which are views captured by cameras which were oriented in a common orientation zone with respect to gravity.

The so-called gravity-aware method aims at creating a set of feature descriptors that describes an object best under a certain range of viewpoints. In a general application this range would most likely cover viewpoints from all directions for a general 3D object and only those showing the front-face for a planar object. In general, it would comprise those viewpoints of an object that the application should be able to deal with.

Many applications deal with objects that have a known orientation with respect to gravity for camera localization. Examples include magazines or game boards lying on a desk, navigation prints on the floor, vertical billboards and posters, building facades for large-scale outdoor augmented reality (AR) or cars for marketing applications. If the pose of a real camera is partially known, e.g. if the direction of the gravity in the camera coordinate system can be measured with inertial sensors, and the orientation of the real object with respect to gravity is known, then a set of reference descriptors which describes the real object under all viewpoints which are consistent with the partially known camera pose would be sufficient. In other words, if a real camera is located above a real object and images it from the top, reference features that allow for localization of the object as seen from the bottom is not helpful. On the contrary, it might even disturb the localization process by introducing false matches.

According to this aspect, it is proposed to create multiple representative feature descriptor sets for different camera orientations with respect to gravity. During runtime, e.g. in a tracking method using a real camera which captures a current image, the globally gravity-aware method then only uses the reference descriptor set of the multiple reference descriptor sets that corresponds to the current measured camera orientation angle of the currently used real camera. Thereby, the same overall amount of reference descriptors to match against can contain much more descriptors representing the object in an orientation similar to the one of the real camera.

As in the approach of the previous aspect, according to an embodiment different synthetic views of a first object are created. These views may then be sorted into bins based on the orientation of the respective virtual camera with respect to gravity, for example based on the angle between the principal axis of the virtual camera that corresponds to the view and the known gravity vector transformed into the camera coordinate system. The method creates feature descriptors for all synthetic views. The stage matching the descriptors in the database against each other is then carried out for every view bin individually. All descriptors belonging to the views in a particular bin are either matched against themselves only or against all descriptors from all view bins.

In short, the iterative or recursive descriptor subset identification is then carried out for every view bin individually, i.e. the descriptor with the highest score parameter may be determined within a particular bin and is added to the final set of descriptors for this bin, containing the feature descriptors from views with a similar camera orientation with respect to gravity (i.e. with a camera orientation belonging to the same orientation zone). Finally, there is provided a set of representative feature descriptors for every view bin.

For a real camera image, e.g. in a method of matching at least one feature of an object in an image of a camera, the proposed gravity-aware method first measures or loads the gravity vector in the camera coordinate system. For example, the gravity vector is provided from a gravity sensor (e.g. accelerometer) associated with the camera which captures the image. This may then be used to compute an orientation angle between the gravity vector and the principal axis of the real camera. For example, the method finally determines the view bin where the average over all orientation angles of the synthetic cameras is closest to the orientation angle of the current real camera and only uses the reference descriptors of the set resulting from that view bin. Note that in a real-time application, the set of reference features to be used might change in every frame (image) based on the current camera orientation, i.e. if the camera orientation changes from one frame to the next frame.

Figure 7:
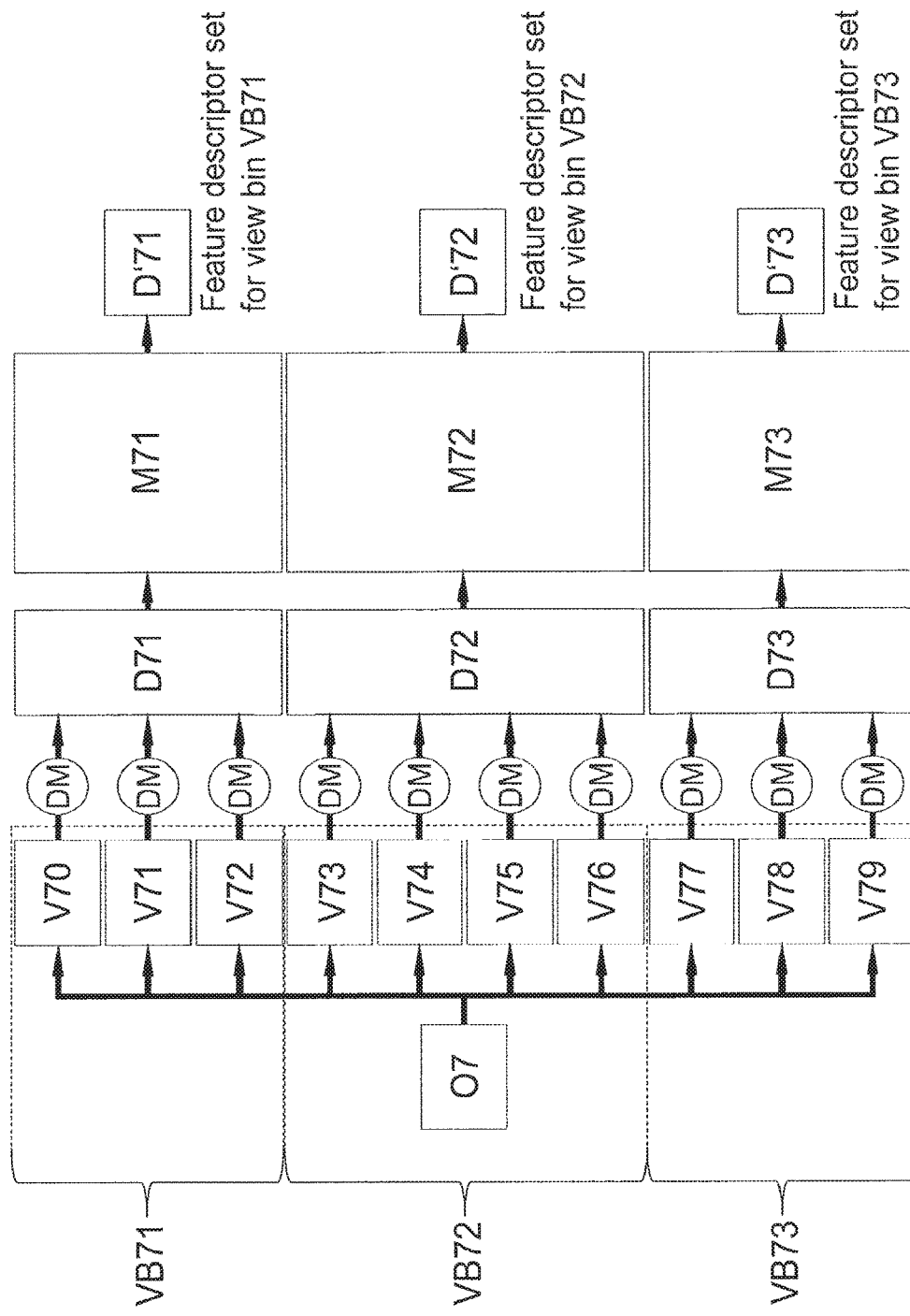
FIG. 7 shows a feature description method according to an embodiment, particularly in connection with a globally gravity-aware method as shown in FIG. 6.

FIG. 7 shows a feature description method according to an embodiment, particularly in connection with a globally gravity-aware method as shown in FIG. 6. Particularly, a high-level flowchart diagram explains an embodiment of the above described globally gravity-aware method in more detail. Similar as in FIGS. 2 and 3, FIG. 7 describes a method of providing a set of feature descriptors configured to be used in matching at least one feature of an object in an image of a camera.

Again, the method starts with providing multiple views of a first object O7 or of multiple instances of a first object O7, wherein the multiple instances provide different appearances or different versions of an object. Each of the views V70-V79 is generated by a respective camera (such as C61-C63 shown in FIG. 6) having a known orientation with respect to gravity (e.g., indicated by a gravity vector g) when generating the respective view. For example, an appropriate model of an object O7 is used to create synthetic views V70-V79 under different conditions. The views V70-V79 may be sorted to view bins based on their orientation with respect to gravity. In this example, the view bin VB71 comprises the views V70, V71, V72, while the view bin VB72 contains the views V73, V74, V75, V76, and the views V77, V78 and V79 fall into the bin VB73. For each bin, this method then proceeds as in the proposed method shown in FIG. 2.

In a further step, in at least two of the views V70-V79 at least one feature is extracted from the respective view, and a descriptor for an extracted feature is provided. The descriptors for a plurality of extracted features are stored in multiple sets of descriptors D71-D73 with at least a first set of descriptors (such as D71) and a second set of descriptors (such as D72). The first set of descriptors D71 contains descriptors of features which were extracted from views V70-V72 corresponding to a first orientation zone with respect to gravity of the respective camera, and the second set of descriptors D72 contains descriptors of features which were extracted from views V73-V76 corresponding to a second orientation zone with respect to gravity of the respective camera. This step may also include storing the descriptors in three or more sets of descriptors corresponding to three or more orientation zones with respect to gravity of the respective camera, as shown in FIG. 7 for three orientation zones.

In a next step, a plurality of the descriptors d of the first set of descriptors D71 is matched against a plurality of the descriptors d of the first set of descriptors D71, and a plurality of the descriptors d of the second set of descriptors D72 is matched against a plurality of the descriptors d of the second set of descriptors D72. This matching may be performed in respective descriptor subset identification methods M71-M73, comparable to descriptor subset identification method M2 described with reference to FIG. 2. In the present example, the descriptors of set D71 from the view bin VB71 are fed into the descriptor subset identification method M71 which results in a final set of descriptors D'71 for this view bin. Analogically, the descriptor set D'72 is created for view bin VB72 and descriptor set D'73 is based on the descriptors from view bin VB73.

According to an embodiment, this step may include matching a plurality of the descriptors of the first set of descriptors D71 against a plurality of the descriptors of the first set of descriptors D71 or of the first set of descriptors D71 and the second set of descriptors D72, and matching a plurality of the descriptors of the second set of descriptors D72 against a plurality of the descriptors of the second set of descriptors D72 or of the first set of descriptors D71 and the second set of descriptors D72. For more than two sets of descriptors, this may be applied analogously for set of descriptors D73, i.e., for example, the descriptors of the first set of descriptors D71 may be matched against descriptors of D71 only, or against descriptors of a plurality or all of D71 to D73.

In a further step, a score parameter is assigned to a plurality of the descriptors as a result of the matching process, similar as in the method of FIG. 2. Thereafter, within the first set of descriptors D71 at least one descriptor is selected based on its score parameter in comparison with score parameters of other descriptors, and the selected descriptor is stored in a third set of descriptors D'71. Analogously, within the second set of descriptors D72 at least another descriptor is selected based on its score parameter in comparison with score parameters of other descriptors, and the selected another descriptor is stored in a fourth set of descriptors D'72. If more than two orientation zones are used, this process is analogously performed for descriptor set D73 resulting in a reduced set of descriptors D'73, and so on.

In a next step, the score parameter of a selected descriptor in the first and/or second set of descriptors D71, D72 is modified, or alternatively a selected descriptor in the first and/or second set of descriptors D71, D72 is designated such that the selected descriptor is disregarded for selection in a following selection step as described above. The steps of selecting and modifying (cf. FIG. 5, steps S52 and S53) are processed repeatedly multiple times, thereby storing in the third and fourth set of descriptors D'71, D'72 each a number of selected descriptors which is lower than the number of descriptors stored in the first set and second set of descriptors D71, D72, respectively. According to an embodiment, if the method includes storing the descriptors in three or more sets of descriptors corresponding to three or more orientation zones, then this step includes storing in three or more sets of descriptors each a number of selected descriptors which is lower than the number of descriptors stored in the respective initial sets of descriptors. The third and fourth set of de-scriptors D'71, D'72 and any further set of descriptors, such as D'73, are configured to be used in matching at least one feature of the first object or of a second object in an image of a camera, for example in a live camera image of an augmented reality application.

According to an embodiment, the method may include calculating an orientation angle between the principal axis and a provided gravity vector of the camera that corresponds to the respective view in order to determine an orientation of the respective camera with respect to gravity. For the calculated orientation angle it is determined whether it corresponds to the first or second orientation zone. For example, the first orientation zone may comprise orientation angles from 60° to 90° and the second orientation zone angles from 60° to 30°. If the calculated orientation angle corresponds to the first orientation zone, the descriptor of the extracted feature of the respective view (such as V70-V72) is stored in the first set of descriptors (such as D71), and if it corresponds to the second orientation zone the descriptor of the extracted feature of the respective view (such as V73-V76) is stored in the second set of descriptors (such as D72).

Particularly, the method further includes determining for each descriptor a gravity vector g of the camera which provides the respective view.

Figure 8:
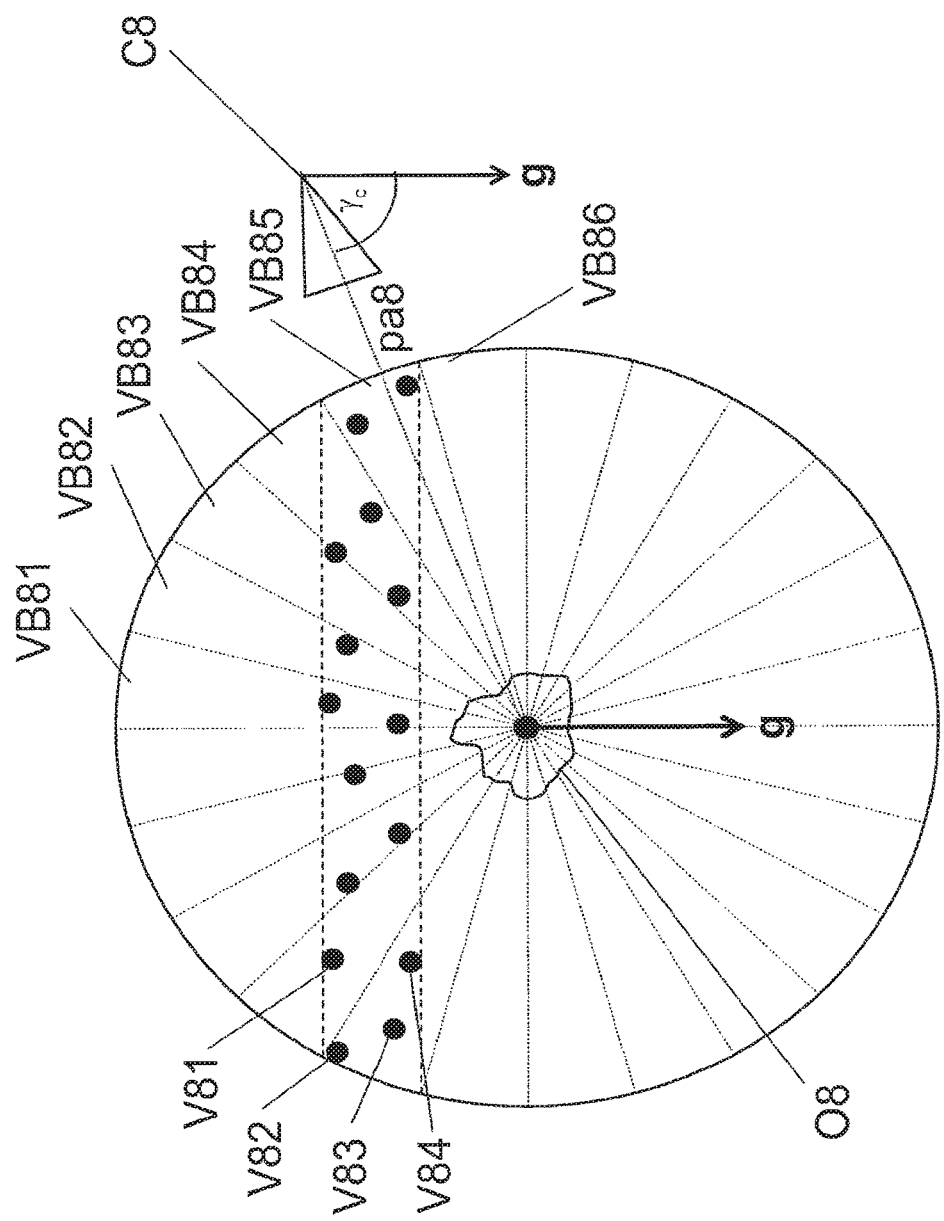
FIG. 8 shows an aspect of a feature description method according to an embodiment, particularly in connection with a globally gravity-aware method as shown in FIGS. 6 and 7.

According to another aspect of the invention, there is provided a method of matching at least one feature of an object in an image of a camera, comprising providing at least one image with an object captured by a camera, extracting current features from the at least one image and providing a set of current feature descriptors with at least one current feature descriptor provided for an extracted feature, providing the third and the fourth set of descriptors (such as D'71 and D'72 of FIG. 7), and comparing the set of current feature descriptors with the third and/or fourth set of descriptors for matching at least one feature of the object in the at least one image. In this regard, FIG. 8 shows an aspect of such feature description method according to an embodiment, particularly in connection with a globally gravity-aware method as shown in FIGS. 6 and 7, but which may also be used with a locally gravity-aware method as set out below. For a real camera C8 capturing an object O8 in an image, the method measures or loads the gravity vector g in the camera coordinate system. This vector g is then used to compute an orientation angle γc between the gravity vector g and the principal axis pa8 of the camera C8.

For example, the method comprises providing a gravity vector g of the camera C8 which captures the at least one image, determining an orientation of the camera C8 with respect to gravity and associating the determined orientation of the camera C8 with the first orientation zone or with the second orientation zone. The set of current feature descriptors are then matched with the third set of descriptors (such as D'71 in FIG. 7), if the determined orientation of the camera C8 is associated with the first orientation zone (in the example of FIG. 7, corresponding to view bin VB71), and the set of current feature descriptors is matched with the fourth set of descriptors (such as D'72 in FIG. 7), if the determined orientation of the camera is associated with the second orientation zone (in the example of FIG. 7, corresponding to view bin VB72). For example, the gravity vector g is provided from a gravity sensor associated with the camera C8.

For example, the method determines the view bin where the average over all gravity angles of the synthetic cameras is closest to the orientation angle γc. In the example of FIG. 8, this bin is VB85. For this image (frame) captured by camera C8, the features in the current camera image of the real camera C8 are then only matched against the descriptors of the reduced descriptor set (corresponding to D'71-D'73 of FIG. 7) resulting from the views in the bin VB85 which consists of the views V81, V82, V83, V84, etc. illustrated as black circles.

Figure 9:
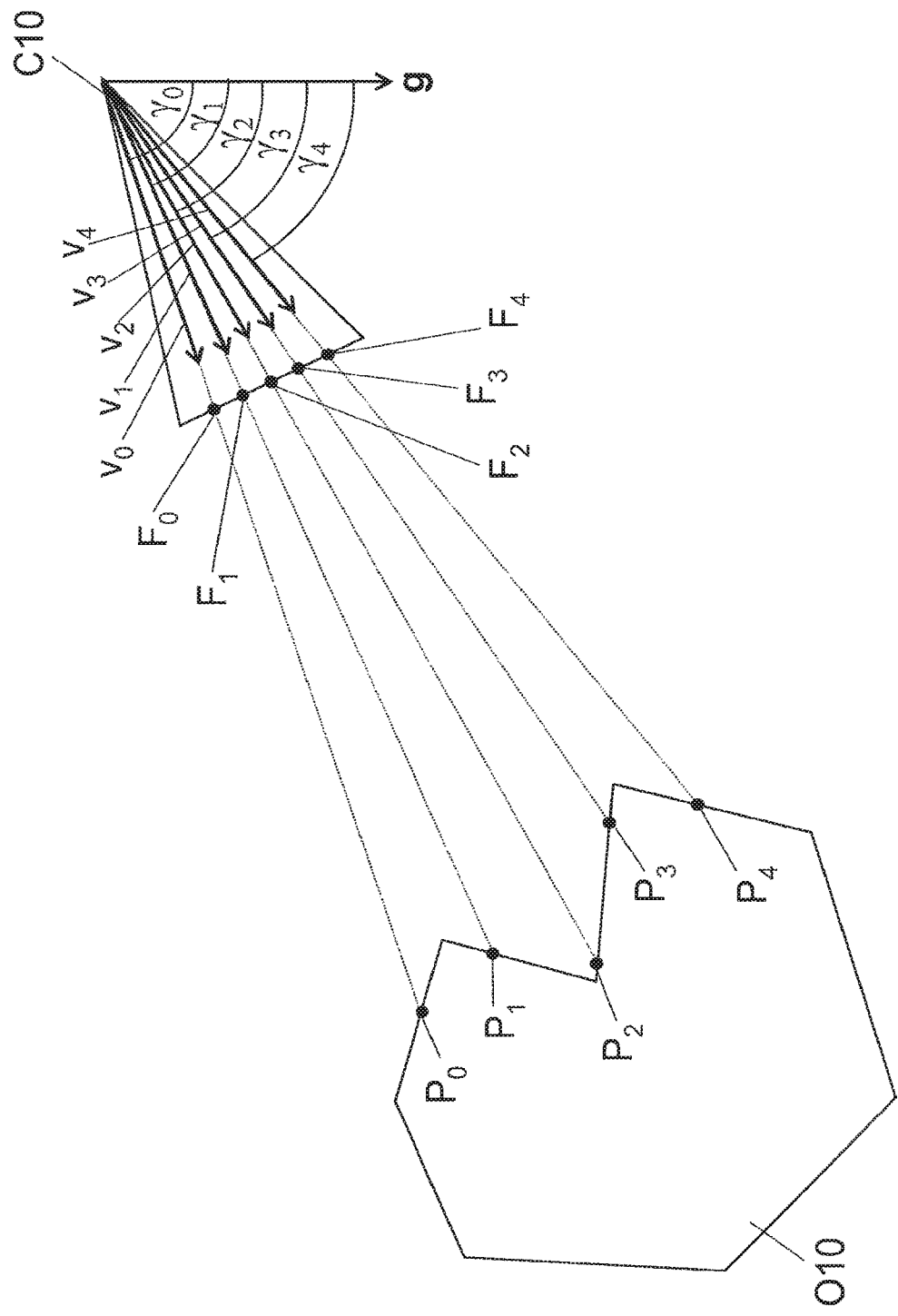
FIG. 9 shows an aspect of a feature description method according to an embodiment, particularly in connection with a so-called locally gravity-aware method.
Figure 10:
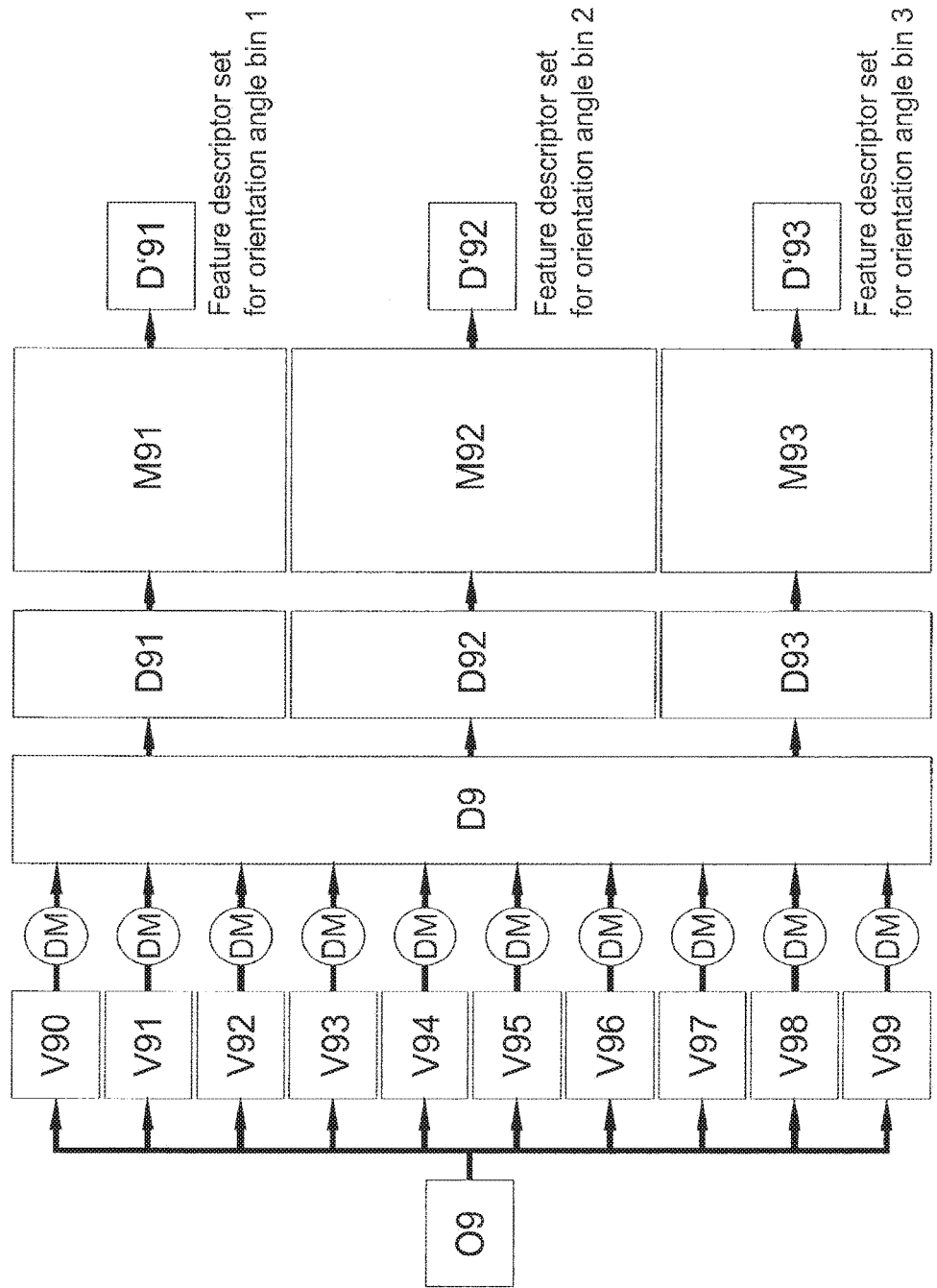
FIG. 10 shows a feature description method according to an embodiment, particularly in connection with a locally gravity-aware method as shown in FIG. 9.

FIGS. 9 and 10 show an aspect of a feature description method according to another embodiment of the invention, particularly a so-called locally gravity-aware method. Similar as in the previous aspect of the globally gravity-aware method (FIGS. 6-8), it is proposed to create multiple representative feature descriptor sets for different orientation zones with respect to gravity.

For many real cameras the intrinsic parameters, i.e. the focal length and the principal point, are either known or can be estimated. In this case, for each pixel in the camera image, a 3D ray in the camera coordinate system can be computed that originates from the camera's origin and points towards the 3D point imaged in this pixel. The same applies to the virtual cameras used in the synthetic view creation algorithm.

In this regard, FIG. 9 shows a camera C10 in an arrangement similar as camera C8 according to FIG. 8. If the intrinsic parameters of a camera C10 are known or can be estimated, it is proposed a so-called locally gravity-aware method, which computes an orientation angle with respect to gravity for multiple feature descriptors individually, as illustrated in FIG. 9. The points P0, P1, P2, P3, P4 that are located on the object O10, which has a known and static orientation with respect to gravity, are imaged by a camera C10 as features F0, F1, F2, F3, F4 on the image plane. Based on the gravity vector g in camera coordinates and the known or estimated focal length and principal point of the camera C10, orientation angles γ0, γ1, γ2, γ3, γ4 of the individual descriptors for the corresponding features F0, F1, F2, F3, F4 can be computed. They correspond to the angle between the ray from the camera center of C10 to the respective feature point on the surface (image plane) and the gravity vector g in the camera coordinate system.

Instead of using an orientation angle between the gravity vector and the principal axis of the camera for sorting views to bins, as explained in the previous aspect, it is now proposed a locally gravity-aware method, which computes an orientation angle with respect to gravity for multiple, e.g. every, feature descriptor individually. Thereby the orientation angle of a descriptor may be defined as the angle between the gravity vector and the ray pointing from the camera center towards the feature that is described by the descriptor.

As in the previous aspects, the proposed locally gravity-aware method first creates multiple views under different conditions of the object and detects and describes features from every view and collects them in a database set of descriptors. For every descriptor, the corresponding gravity vector or gravity orientation angle is stored with the descriptor. The orientation angle is then used to sort the descriptors into at least two bins, where descriptors with similar orientation angles fall in the same bin. Every such orientation angle subset is then processed in the same way as the descriptors of a view set in the previous approach described with reference to FIGS. 6-8. The offline algorithm then continues in a manner as the globally gravity-aware method described in the previous aspect.

FIG. 10 shows a feature description method according to an embodiment in connection with a locally gravity-aware method as shown in FIG. 9. Particularly, in a similar scheme as in FIG. 7, a high-level flowchart diagram explains an embodiment of the above described locally gravity-aware method in more detail. Again, the method starts with providing multiple views of an object O9 or of multiple instances of the object O9. Each of the views V90-V99 is generated by a respective camera (such as C10 shown in FIG. 9) having a known orientation with respect to gravity (e.g., indicated by a gravity vector g) when generating the respective view.

In a further step, in at least two of the views V90-V99 at least one feature is extracted from the respective view, and a descriptor for an extracted feature is provided. For instance, the descriptors for a plurality of extracted features are first stored in a common database D9. The descriptors for a plurality of extracted features are then stored in multiple sets of descriptors D91-D93. For example, for each descriptor for an extracted feature an orientation angle (such as $\gamma 0$-$\gamma 4$) between a ray pointing from the respective camera center towards the respective extracted feature that is described by the descriptor and a provided gravity vector g of the camera is calculated. For the calculated orientation angle it is determined whether it corresponds to a first or second orientation zone (if the method implements two orientation zones). For example, the first orientation zone may comprise orientation angles from 60° to 90° and the second orientation zone angles from 60° to 30°. If the calculated orientation angle corresponds to the first orientation zone, the respective descriptor is stored in the first set of descriptors (such as D91) and if it corresponds to the second orientation zone, the respective descriptor is stored in the second set of descriptors (such as D92).

In a next step, a plurality of the descriptors d of a first set of descriptors D91 is matched against a plurality of the descriptors d of the first set of descriptors D91, and a plurality of the descriptors d of a second set of descriptors D92 is matched against a plurality of the descriptors d of the second set of descriptors D92. This matching may be performed in respective descriptor subset identification methods M91-M93, comparable to descriptor subset identification method M2 described with reference to FIG. 2. In the present example, the descriptors of set D91 are fed into the descriptor subset identification method M91 which results in a reduced final set of descriptors D'91. Analogically, the descriptor sets D'92 and D'93 are created. This step may also include the variations as described with reference to FIG. 7.

In a further step, a score parameter is assigned to a plurality of the descriptors as a result of the matching process, similar as in the methods of FIG. 2 and FIG. 7. Thereafter, within the first set of descriptors D91 at least one descriptor is selected based on its score parameter in comparison with score parameters of other descriptors, and the selected descriptor is stored in a third set of descriptors D'91. Analogously, within the second set of descriptors D92 at least another descriptor is selected based on its score parameter in comparison with score parameters of other descriptors, and the selected another descriptor is stored in a fourth set of descriptors D'92. If more than two orientation zones are used, this process is analogously performed for descriptor set D93 resulting in a reduced set of descriptors D'93, and so on. In a next step, the score parameter of a selected descriptor in the first and/or second set of descriptors D91, D92 is modified, or alternatively a selected descriptor in the first and/or second set of descriptors D91, D92 is designated such that the selected descriptor is disregarded for selection in a following selection step as described above with reference to FIG. 7.

According to another aspect, there is provided a method of matching at least one feature of an object in an image of a camera, comprising providing at least one image with an object captured by a camera, extracting current features from the at least one image and providing a set of current feature descriptors with at least one current feature descriptor provided for an extracted feature, providing a third and a fourth set of descriptors as set out above, and comparing the set of current feature descriptors with the third and/or fourth set of descriptors for matching at least one feature of the object in the at least one image.

For example, for a given camera image or a real camera, the method of matching at least one feature of an object in the image of the camera (so-called online-method) measures or loads the gravity vector g in the camera coordinate system. Features are then extracted from the camera image resulting in a set of current feature descriptors. Using the measured gravity (e.g., gravity vector g) and an estimate of the intrinsic camera parameters, an orientation angle (such as $\gamma 0$-$\gamma 4$ shown in FIG. 9) is computed for every feature descriptor in the current camera image as the angle between the gravity vector g and a ray pointing from the camera center towards that feature. Every feature descriptor from the current camera image is then only matched against the reference set of descriptors that has the closest orientation angle.

For example, for each descriptor of the current camera image an orientation angle is calculated and associated with the first orientation zone or with the second orientation zone. At least one of the current feature descriptors is matched with the third set of descriptors (such as D'91), if the determined orientation angle of that current feature descriptor is associated with the first orientation zone, and at least one of the current feature descriptors is matched with the fourth set of descriptors (such as D'92), if the determined orientation angle of that current feature descriptor is associated with the second orientation zone.

In the following, further exemplary implementations are described:

There are different ways to implement the individual steps and sub-methods involved in this invention. The following will explain some example implementations in order to provide a better understanding of the methods without restricting the invention to these implementations.

Synthetic View Creation Method:

The geometric transformation which is part of the synthetic view creation method can for instance be a projective or affine homography for planar objects. In this case, synthetic views are created by means of image warping using bilinear interpolation or nearest-neighbor interpolation. For arbitrary objects, a rigid body transformation and the pinhole camera model can be applied as the basis of the geometric transformation.

The centers of the virtual cameras can for instance be located at the vertices of an ico-sphere centered on the object as shown in FIG. 6. For certain applications where the real camera is expected to only move within a constraint range, e.g. on a plane, the positions of the virtual camera are chosen accordingly, i.e. on that plane.

The model of the object can for instance be a textured triangle mesh which can be rendered using rasterization or a point cloud or volume which can be rendered using ray tracing, ray casting or splatting. For the realistic synthesis of illumination effects, global illumination rendering methods such as ray tracing or radiosity can be applied.

Feature Detection and Description Method:

The features that are detected in the synthetic views of an object can be point features, e.g. detected by means of detectors like SIFT, SURF, Harris, FAST, etc. However, a feature can also be an edge or any other geometrical primitive or set of pixels that can be described.

Descriptor Matching Method:

The matching descriptor within a set of descriptors for a given descriptor can for instance be defined as the nearest neighbor in descriptor space using a distance function such as the sum-of-squared-differences. The nearest neighbor can be determined, for instance, using exhaustive search or can be approximated by approximate nearest neighbor search methods such as KD-trees. Additionally, the matching method can contain a condition which a match needs to fulfill. This can be, for instance, that the distance of the matching descriptors is below a particular threshold or that the ratio between the distance to the nearest neighbor and the second nearest neighbor is above a certain threshold.

Iterative Descriptor Subset Identification Method:

The score parameter of a descriptor that is computed and used in the iterative subset identification method can be defined and computed in different ways.

Examples include the number of matches of a descriptor, the smallest distance to a descriptor over all descriptors or the average similarity over all matched descriptors.

Binning/Clustering Method:

There may be different strategies to define the ranges of the orientation angle that correspond to a bin. The orientation angle may be defined in the range [0°, 180°]. One possible strategy is to evenly divide this range into N bins being [0°, 180°/N], [180°/N, 2*180°/n], ..., [(N-1)*180°/N, 180°]. Depending on the applications, it might also make sense to adaptively choose the bins according to the dataset, e.g. by means of clustering algorithms such as k-means.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

The invention claimed is:

1. A method comprising:
    obtaining a plurality of images of an object;
    obtaining a plurality of feature descriptors from the plurality of images;
    generating a descriptor set, wherein generating the descriptor set comprises:
        comparing each feature descriptor within the plurality of feature descriptors to at least each other feature descriptor of the plurality of feature descriptors to determine match scores; and
        assigning a subset of the plurality of feature descriptors to the descriptor set based on the match scores; and
    identifying the object in an additional image based on the descriptor set.

2. The method of claim 1, wherein generating the descriptor set comprises iteratively assigning a feature descriptor having a highest match score to the descriptor set and generating new match scores for a remaining plurality of feature descriptors until a number of feature descriptors in the descriptor set satisfies a threshold.

3. The method of claim 1, wherein generating the descriptor set comprises iteratively assigning a feature descriptor having a highest match score to the descriptor set and reducing the highest match score of the feature descriptor until a number of feature descriptors in the descriptor set satisfies a threshold.

4. The method of claim 1, further comprising:
    obtaining a model of the object;
    identifying a spatial transformation to project the model onto an image plane; and
    generating a particular image of the plurality of images based on the model and the spatial transformation.

5. The method of claim 4, wherein the spatial transformation corresponds to a rigid body transformation, a parallel projection, a perspective projection, a non-linear transformation, or a combination thereof.

6. The method according to claim 4, wherein the particular image is generated using an image rendering technique that simulates camera defocus, a motion blur, an exposure time, a brightness, a contrast, a light source, a shadow, a reflection, a lens flare, a bloom effect, an environment mapping effect, or a combination thereof.

7. The method of claim 1, wherein generating the descriptor set comprises:
    changing a value of a highest scored feature descriptor to an average value
    of the highest scored feature descriptor and feature descriptors that match the highest scored feature descriptor before adding the highest scored feature descriptor to the descriptor set.

8. A non-transitory computer readable medium comprising computer readable code executable by one or more processors to:
    obtain a plurality of images of an object;
    obtain a plurality of feature descriptors from the plurality of images;
    generate a descriptor set, wherein the computer readable code executable by the one or more processors to generate the descriptor set comprises computer readable code executable by the one or more processors to:
        compare each feature descriptor within the plurality of feature descriptors to at least each other feature descriptor of the plurality of feature descriptors to determine match scores; and
        assign a subset of the plurality of feature descriptors to the descriptor set based on the match scores; and
    identify the object in an additional image based on the descriptor set.

9. The non-transitory computer readable medium of claim 8, wherein the computer readable code is further executable by the one or more processors to determine whether to generate the plurality of images based on:
    a model of the object and one or more spatial transformations to project the model onto one or more image planes; or
    one or more warping functions applied to an image of the object.

10. The non-transitory computer readable medium of claim 9, wherein the computer readable code is further executable by the one or more processors to iteratively assign a feature descriptor having a highest match score to the descriptor set and to reduce the highest match score of the feature descriptor until a number of feature descriptors in the descriptor set satisfies a threshold.

11. The non-transitory computer readable medium of claim 8, wherein the computer readable code is further executable by the one or more processors to:

obtain a set of current feature descriptors from the additional image; and perform a comparison of the set of current feature descriptors with the descriptor set to match at least one feature of the object in the additional image.

12. The non-transitory computer readable medium of claim 11, wherein the computer readable code is further executable by the one or more processors to:

determine a position and orientation of a camera that captured the additional image with respect to the object based on a result of the comparison.

13. The non-transitory computer readable medium of claim 8, wherein the computer readable code is further executable by the one or more processors to use the descriptor set to localize an object in an image in an augmented reality application.

14. A system comprising:
a camera;
one or more processors; and
a memory coupled to the one or more processors and comprising computer readable code executable by the one or more processors to:
  obtain, from the camera, a plurality of images of an object;
  obtain a plurality of feature descriptors from the plurality of images;
  generate a descriptor set, wherein the computer readable code executable by the one or more processors to generate the descriptor set comprises computer readable code executable by the one or more processors to:
    compare each feature descriptor within the plurality of feature descriptors to each feature descriptor of the plurality of feature descriptors to determine match scores; and
    assign a subset of the plurality of feature descriptors; and
  identify the object in an additional image based on the descriptor set.

15. The system of claim 14, wherein the computer readable code executable by the one or more processors to generate the descriptor set comprises computer readable code executable by the one or more processors to iteratively assign a feature descriptor having a highest match score to the descriptor set and rescore a remaining plurality of feature descriptors until a number of feature descriptors in the descriptor set satisfies a threshold.

16. The system of claim 14, wherein the computer readable code executable by the one or more processors to generate the descriptor set comprises computer readable code executable by the one or more processors to iteratively assign a feature descriptor having a highest match score to the descriptor set and to reduce the highest match score of the feature descriptor until a number of feature descriptors in the descriptor set satisfies a threshold.

17. The system of claim 14, wherein the memory further comprises computer readable code executable by the one or more processors to:

match a second object to the object using the descriptor set.

18. The system of claim 14, wherein the memory further comprises computer readable code executable by the one or more processors to:

obtain a set of current feature descriptors from the additional image; and perform a comparison of the set of current feature descriptors with the descriptor set to match at least one feature of the object in the additional image.

19. The system of claim 18, wherein the additional image is captured by the camera, and wherein the memory further comprises computer readable code executable by the one or more processors to:

determine a position and orientation of the camera with respect to the object based on a result of the comparison.

20. The system of claim 14, wherein the memory further comprises computer readable code executable by the one or more processors to use the descriptor set to localize an object in an image in an augmented reality application.

21. A method of generating a descriptor set, comprising:
obtaining a plurality of images of an object wherein an appearance of the object differs in each of the plurality of images;
obtaining a plurality of feature descriptors from the plurality of images;
matching feature descriptors within the plurality of feature descriptors;
scoring each of the plurality of features based on the matching;
generating a descriptor set based on the scoring, wherein the descriptor set comprises a subset of the plurality of feature descriptors; and
utilizing the descriptor set to identify the object in an additional image.

* * * * *